United States Patent

Ohtani et al.

[11] Patent Number: 5,840,216
[45] Date of Patent: Nov. 24, 1998

[54] ELECTROCONDUCTIVE PASTE AND LAMINATED CERAMIC ELECTRIC PART

[75] Inventors: Akira Ohtani, Shiga-ken; Kunihiko Hamada, Takefu, both of Japan

[73] Assignee: Murata Manufacturing Co., Ltd., Kyoto, Japan

[21] Appl. No.: 691,937

[22] Filed: Aug. 5, 1996

[30] Foreign Application Priority Data

Aug. 7, 1995 [JP] Japan .................................. 7-200793

[51] Int. Cl.$^6$ .............................. H01B 1/02; H01B 1/16
[52] U.S. Cl. .............................. 252/514; 252/512; 427/61
[58] Field of Search ..................... 252/512, 513, 252/514; 427/61

[56] References Cited

U.S. PATENT DOCUMENTS 3,793,064  2/1974  Budd et al. .............................. 252/514
5,376,596  12/1994  Tokuda et al. ............................. 501/19
5,518,663  5/1996  LaBranche et al. ..................... 252/514
5,536,293  7/1996  Yamamoto et al. ...................... 75/255

FOREIGN PATENT DOCUMENTS 6103810  4/1994  Japan .
6349313  12/1994  Japan .

Primary Examiner—Mark Kopec
Attorney, Agent, or Firm—Strolenk, Faber, Gerb & Soffen, LLP

[57] ABSTRACT

Disclosed is an electroconductive paste and a laminated ceramic electronic part produced by the use of the paste. The part exhibits improved heat-shock resistance during surface mounting thereof. The paste comprises a metal component and glass frit dispersed in an organic vehicle, and the glass frit comprises a zinc borosilicate containing CaO. The proportion of CaO to the total weight of the glass frit is preferably about 3 to 15 wt. %. The laminated ceramic electronic part comprises outer electrodes formed on the sides of the body of the part by baking the paste thereon.

6 Claims, 1 Drawing Sheet

ELECTROCONDUCTIVE PASTE AND LAMINATED CERAMIC ELECTRIC PART

BACKGROUND OF THE INVENTION

Field of the Invention

The present invention relates to an electroconductive paste and a laminated ceramic electronic part and, in particular, to a composition comprising glass frit.

SUMMARY OF THE INVENTION

The present invention has been made with the object of providing an electroconductive paste and a laminated ceramic electronic part improved so as to exhibit an increased resistance to heat shock when surface mounted.

Specifically, the first aspect of the present invention to attain the above-mentioned object is to provide an electroconductive paste comprising a metal component and glass frit dispersed in an organic vehicle, which is characterized in that the glass frit comprises a zinc borosilicate containing calcium oxide (hereinafter referred to as CaO). As one preferred embodiment, the glass frit constituting the paste contains CaO in an amount of from about 3 to 15% by weight relative to the total weight of the glass frit.

The second aspect of the present invention also to attain the above-mentioned object is to provide a laminated ceramic electronic part comprising a laminated ceramic electronic part body and one or more outer electrode disposed on the side(s) of the body, which is characterized in that the outer electrode(s) is/are prepared by baking a paste comprising a metal component and glass frit and that the glass frit comprises a zinc borosilicate containing CaO. As one preferred embodiment, the glass frit used to form the outer electrodes contains CaO in an amount of from about 3 to 15% by weight relative to the total weight of the glass frit.

DETAILED DESCRIPTION OF THE INVENTION

Figure 1:
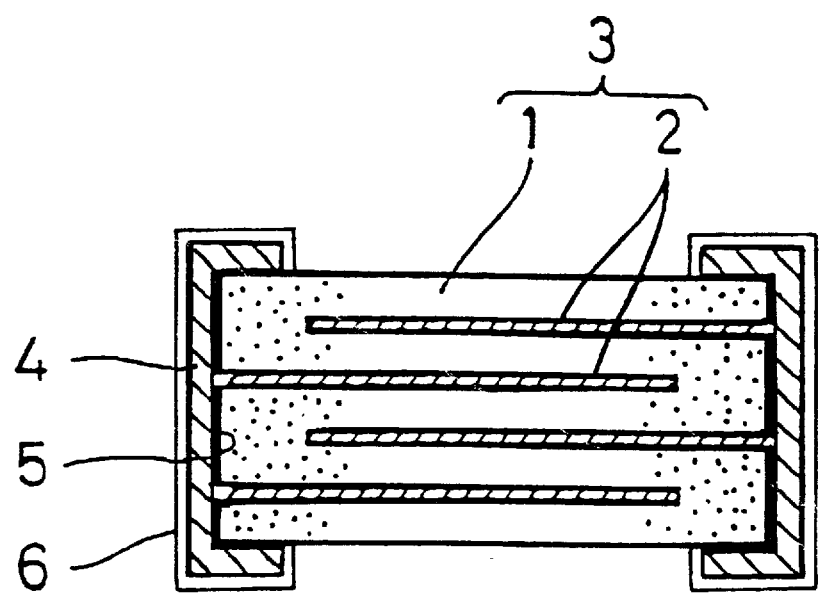
FIG. 1 is a cross-sectional view showing the constitution of a laminated ceramic capacitor.

A laminated ceramic capacitor (hereinafter referred to as a capacitor) such as that shown in FIG. 1 has heretofore been known as a typical example of a laminated ceramic electronic part having outer electrode(s). The capacitor comprises a capacitor body 3, which is prepared by alternately laminating dielectric ceramic layers 1 and inner electrodes 2 followed by baking the resulting laminate, and outer electrodes 4 disposed at both sides of the body 3 in the lengthwise direction thereof in such a manner that the outer electrodes 4 are electrically connected with the inner electrodes 2. An electroconductive paste comprising a metal component, such as palladium (Pd), silver-palladium (Ag—Pd) or the like, capable of being baked together with ceramics is used to form these inner electrodes 2.

To form the outer electrodes 4, used is an electroconductive paste prepared by dispersing a metal component such as silver (Ag), silver-palladium (Ag—Pd) or the like, and a glass frit comprising zinc borosilicate or the like in an organic vehicle. The electroconductive paste is applied onto the sides of the capacitor body 3 by dipping, screen-printing or the like coating methods and baked to form the outer electrodes 4 thereon. When the paste is baked to give the outer electrodes 4, the glass frit existing in the paste precipitates out to establish a glass frit layer 5 between the side of the capacitor body and the outer electrode 4. A plate film 6 comprising nickel (Ni) and tin (Sn) or solder can be formed over the surface of each outer electrode 4 through electrolytic plating, in order to improve the heat resistance and the solderability of the capacitor part.

In general, a conventional capacitor having the constitution mentioned above is mounted on a circuit board by soldering the outer electrodes 4 to the surface of the board. However, if the soldering temperature is high, the capacitor body 3 surrounded by the outer electrodes 4 cracks around its sides and this lowers its ability to function as a capacitor. The cracks are caused by the stress remaining in the capacitor body 3, which has been produced by the baking of the outer electrodes 4 to tightly adhere to the body 3 and released at the soldering temperature when the capacitor is mounted on a wired board.

Preferred embodiments of the present invention are described hereinunder.

FIG. 1 is a cross-sectional view showing the outline of the constitution of a laminated ceramic capacitor, which is one example of a laminated ceramic electronic part. The structure of the capacitor given hereinunder as one embodiment of the present invention is not basically different from that of the conventional capacitor mentioned hereinabove, except for the composition of the glass frit used in the outer electrodes 4. Therefore, FIG. 1 is referred to hereinunder while omitting the detailed description of the structure of the capacitor.

In one embodiment of the present invention, prepared are electroconductive pastes for forming outer electrodes of a laminated ceramic capacitor, which comprise an electroconductive metal component and glass frit dispersed in an organic vehicle. The metal component comprises Ag powder and the glass frit comprises a zinc borosilicate. Seven samples of zinc borosilicate glass frit, Sample 1 to Sample 7 shown in Table 1 below, are prepared. The solid content of each electroconductive paste prepared herein, namely the proportion of the solid component comprising Ag powder and glass frit to the total paste, is 76% by weight. The proportion of the glass frit in the solid component is 6% by weight.

TABLE 1

| Sample No. | Glass Frit (wt. %) | | | | | |
|---|---|---|---|---|---|---|
| | CaO | ZnO | $B_2O_3$ | $SiO_2$ | $Na_2O$ | $Al_2O_3$ |
| 1 | 0.0 | 35.0 | 41.0 | 12.0 | 8.0 | 4.0 |
| 2 | 5.0 | 27.0 | 30.0 | 28.0 | 6.0 | 4.0 |
| 3 | 8.5 | 32.0 | 28.0 | 24.0 | 5.5 | 2.0 |
| 4 | 10.0 | 28.0 | 30.0 | 26.0 | 3.0 | 3.0 |
| 5 | 15.0 | 27.0 | 26.0 | 25.0 | 1.0 | 6.0 |
| 6 | 12.0 | 28.0 | 28.0 | 24.0 | 1.0 | 7.0 |
| 7 | 20.0 | 24.0 | 34.0 | 18.0 | 2.0 | 2.0 |

Of these glass frit samples in Table 1 above, Sample 1 does not contain CaO and has an ordinary glass frit composition while Samples 2 to 7 contain CaO. The resin component constituting the organic vehicle used herein is a cellulosic resin, and the solvent constituting it is a butyl carbitol solvent.

In order to produce a capacitor such as that having the structure shown in FIG. 1, an electroconductive paste for forming the inner electrodes and green sheets comprising dielectric ceramics such as barium titanate, etc. are first prepared. Then an electrode pattern comprising the paste is formed on each green sheet by screen printing or the like, a plurality of the thus-printed green sheets are laminated under pressure, the resulting laminate is cut to have the desired shape and size and then baked at a predetermined temperature to give the capacitor body 3. The capacitor body 3 corresponds to the body of the laminated ceramic electronic part of the present invention.

Another electroconductive paste for forming the outer electrodes, namely the zinc borosilicate glass frit compositions shown in Table 1 above, are prepared, applied onto the both sides of the previously prepared capacitor body 3, for example, by dipping the capacitor body 3 in the paste, and thereafter baked at a peak temperature falling between 750° C. and 850° C. for 10 minutes to form the outer electrodes 4. Next, the surface of each outer electrode 4 is electrolytically plated with nickel (Ni) and tin (Sn) or solder to form the plate film 6 thereon. After this process, a capacitor having the structure shown in FIG. 1 is completed.

Capacitor samples produced in the manner mentioned above were subjected to a heat shock resistance test, which gave the results shown in Table 2 below. In the heat shock resistance test, 100 capacitor samples to be tested were dipped in a solder tank heated at a predetermined temperature, and the number of the samples which cracked was counted. In Table 2, $\Delta T$ indicates the heating temperature.

TABLE 2

| Sample No. | Heat Shock Resistance | |
|---|---|---|
| | $\Delta T = 375°$ C. | $\Delta T = 400°$ C. |
| 1 | 7 | 27 |
| 2 | 1 | 8 |
| 3 | 1 | 8 |
| 4 | 2 | 8 |
| 5 | 4 | 13 |
| 6 | 4 | 11 |
| 7 | — | — |

From Table 2 above, it is seen that 7 of 100 capacitor samples at 375° C. and 27 of 100 at 400° C. where the outer electrodes 4 were made of the electroconductive paste comprising the glass frit of Sample 1 were cracked, while at most only 4 of 100 capacitor samples at 375° C. and 13 of 100 samples at 400° C. where the outer electrodes 4 were made of the electroconductive paste comprising the glass frit of any one of Samples 2 to 6, were cracked. Thus, Table 2 demonstrates the improvement in the heat shock resistance of the capacitor samples of the present invention. The paste comprising the glass frit of Sample 7 did not vitrify in preparing the capacitor samples, which, therefore, could not be subjected to the test. From the test results as above, it is concluded to be desirable that the proportion of CaO to the total weight of glass frit falls between about 3% by weight and 15% by weight and preferably about 5%–12%.

Without being limited to theory, the test results may be considered to indicate the following: The addition of CaO to the zinc borosilicate glass frit resulted in an elevation of the softening point of the glass frit, whereby paste was not tightened around the capacitor body 3 during the baking of the outer electrodes 4 as much as conventionally so that the stress on the body 3 was reduced. For this reason, the degree of the stress to be released from the capacitor body 3 at the soldering temperature during the surface mounting thereof would be lowered and therefore the capacitor body 3 became hardly cracked.

In this embodiment, a zinc borosilicate glass frit was used to prepare the electroconductive pastes. In place of using such zinc borosilicate glass frit, it is also possible to use glass frit mixtures comprising zinc borosilicate glass frit and from about 10 to 40% by weight or so of other glass frits such as lead glass frit, etc. In the above embodiment, capacitor samples were used as examples of the laminated ceramic electronic part with outer electrodes of the present invention, but these are not intended to restrict the scope of the present invention. Needless-to-say, the present invention can apply also to laminated ceramic resistors such as PTC thermistors, NTC thermistors, varistors, etc.

As has been described in detail hereinabove, the electroconductive paste of the present invention and the laminated ceramic electronic part of the present invention produced by the use of the paste are advantageous in that the part exhibits extremely improved heat-shock resistance during surface mounting thereof. Using the parts of the present invention, it is possible to prevent the lowering of the function of the electronic products from being produced.

While the invention has been described in detail and with reference to specific embodiments thereof, it will be apparent to one skilled in the art that various changes and modifications can be made therein without departing from the spirit and scope thereof.

What is claimed is:

1. An electroconductive paste comprising a metal and glass frit dispersed in an organic vehicle, wherein the glass frit comprises a zinc borosilicate containing about 5 to 12 wt % calcium oxide and $SiO_2$, $B_2O_3$, ZnO, $Na_2O$ and $Al_2O_3$ wherein the proportion of zinc oxide to the total weight of the glass frit is from about 27 to 32% by weight.

2. A laminated ceramic electronic part comprising a body having an outer electrode formed at a side of the body, wherein the outer electrode is a baked paste comprising a metal and glass frit and that the glass frit comprises a zinc borosilicate containing about 5 to 12 wt % calcium oxide and $SiO_2$, $B_2O_3$, ZnO, $Na_2O$ and $Al_2O_3$ wherein the proportion of zinc oxide to the total weight of the glass frit is from about 27 to 32% by weight.

3. The laminated ceramic electronic part as claimed in claim 2, wherein the glass frit is a zinc borosilicate consisting of $SiO_2$, $B_2O_3$, ZnO, CaO, $Na_2O$ and $Al_2O_3$.

4. The laminated ceramic electronic part as claimed in claim 3, in which the amount of $SiO_2$ is 24 to 28% by weight, the amount of $B_2O_3$ is 26 to 30% by weight, the amount of $Na_2O$ is 1 to 6% by weight and the amount of $Al_2O_3$ is 2 to 7% by weight.

5. The electroconductive paste as claimed in claim 1, wherein the glass frit is a zinc borosilicate consisting of $SiO_2$, $B_2O_3$, ZnO, CaO, $Na_2O$ and $Al_2O_3$.

6. The laminated ceramic electronic part as claimed in claim 5, in which the amount of $SiO_2$ is 24 to 28% by weight, the amount of $B_2O_3$ is 26 to 30% by weight, the amount of $Na_2O$ is 1 to 6% by weight and the amount of $Al_2O_3$ is 2 to 7% by weight.

* * * * *